(12) United States Patent
Brosius et al.

(10) Patent No.: US 8,255,149 B2
(45) Date of Patent: Aug. 28, 2012

(54) SYSTEM AND METHOD FOR DUAL-MODE LOCATION DETERMINATION

(75) Inventors: Jay Brosius, Frederick, MD (US); James B. Kilfeather, Purcellville, VA (US); Richard Burtner, Ashburn, VA (US)

(73) Assignee: SkyBitz, Inc., Herndon, VA (US)

( * ) Notice: Subject to any disclaimer, the term of this patent is extended or adjusted under 35 U.S.C. 154(b) by 1265 days.

(21) Appl. No.: 11/044,708

(22) Filed: Jan. 28, 2005
(Under 37 CFR 1.47)

(65) Prior Publication Data

US 2005/0261833 A1  Nov. 24, 2005

Related U.S. Application Data

(63) Continuation-in-part of application No. 11/030,983, filed on Jan. 10, 2005, which is a continuation of application No. 10/754,492, filed on Jan. 12, 2004, which is a continuation of application No. 10/191,288, filed on Jul. 10, 2002, now Pat. No. 6,725,158, which is a continuation of application No. 09/984,069, filed on Oct. 26, 2001, now Pat. No. 6,480,788, which is a continuation-in-part of application No. 09/351,852, filed on Jul. 12, 1999, now Pat. No. 6,243,648.

(60) Provisional application No. 60/243,430, filed on Oct. 27, 2000, provisional application No. 60/634,256, filed on Dec. 9, 2004.

(51) Int. Cl.
*G06F 17/00* (2006.01)
*H04Q 7/20* (2006.01)

(52) U.S. Cl. ..... 701/200; 455/427; 455/424; 455/404.2; 455/456.1

(58) Field of Classification Search ............... 701/213, 701/215, 200; 455/427, 424, 431, 437, 456, 455/456.1, 404.2; 342/457, 352, 357.16, 342/342.06, 342.08
See application file for complete search history.

(56) References Cited

U.S. PATENT DOCUMENTS

| | | | |
|---|---|---|---|
| 3,063,048 A | 11/1962 | Lehan et al. |
| 3,124,799 A | 3/1964 | Hagedorn et al. |
| 3,172,108 A | 3/1965 | McClure |
| 3,191,176 A | 6/1965 | Guier |
| 3,242,494 A | 3/1966 | Gicca |
| 3,351,943 A | 11/1967 | Bush et al. |
| 3,384,891 A | 5/1968 | Anderson |

(Continued)

FOREIGN PATENT DOCUMENTS

EP  0488739 A1  3/1992

(Continued)

*Primary Examiner* — Ronnie Mancho
(74) *Attorney, Agent, or Firm* — Duane S. Kobayashi

(57) ABSTRACT

A geographic tracking system with minimal power and size required at the mobile terminal collects observation data at the mobile terminal, forwards the data to a processor, which calculates the position. The mobile terminal needs only to gather a few milliseconds of observation data, and to relay this observation data to the processor. In one embodiment, the observation data is communicated to the processor using either a satellite communication network or through a mobile telephone network.

17 Claims, 7 Drawing Sheets

U.S. PATENT DOCUMENTS

| | | | |
|---|---|---|---|
| 3,806,936 A | 4/1974 | Koster | |
| 4,359,733 A | 11/1982 | O'Neill | |
| 4,701,934 A | 10/1987 | Jasper | |
| 4,751,512 A | 6/1988 | Longaker | |
| 4,819,053 A | 4/1989 | Halavais | |
| 4,896,287 A | 1/1990 | O'Donnell et al. | |
| 4,975,707 A | 12/1990 | Smith | |
| 4,998,111 A | 3/1991 | Ma et al. | |
| 5,008,679 A | 4/1991 | Effland et al. | |
| 5,017,926 A | 5/1991 | Ames et al. | |
| RE33,629 E | 7/1991 | Palmer et al. | |
| 5,103,459 A | 4/1992 | Gilhousen et al. | |
| 5,119,102 A | 6/1992 | Barnard | |
| 5,126,748 A | 6/1992 | Ames et al. | |
| 5,202,901 A | 4/1993 | Chennakeshu et al. | |
| 5,303,286 A | 4/1994 | Wiedeman | |
| 5,303,393 A | 4/1994 | Noreen et al. | |
| 5,309,474 A | 5/1994 | Gilhousen et al. | |
| 5,361,072 A | 11/1994 | Barrick et al. | |
| 5,365,516 A | 11/1994 | Jandrell | |
| 5,365,544 A | 11/1994 | Schilling | |
| 5,367,306 A | 11/1994 | Hollon et al. | |
| 5,379,047 A | 1/1995 | Yokev et al. | |
| 5,392,287 A | 2/1995 | Tiedemann, Jr. et al. | |
| 5,396,647 A | 3/1995 | Thompson et al. | |
| 5,412,388 A | 5/1995 | Attwood | |
| 5,412,389 A | 5/1995 | Olds | |
| 5,414,432 A | 5/1995 | Penny, Jr. et al. | |
| 5,414,728 A | 5/1995 | Zehavi | |
| 5,459,473 A | 10/1995 | Dempster et al. | |
| 5,469,468 A | 11/1995 | Schilling | |
| 5,485,486 A | 1/1996 | Gilhousen et al. | |
| 5,528,228 A | 6/1996 | Wilk | |
| 5,546,087 A | 8/1996 | Martin Neira | |
| 5,554,993 A | 9/1996 | Brickell | |
| 5,557,637 A | 9/1996 | Glynn | |
| 5,565,764 A | 10/1996 | Priebe et al. | |
| 5,587,715 A | 12/1996 | Lewis | |
| 5,594,754 A | 1/1997 | Dohi | |
| 5,627,546 A | 5/1997 | Crow | |
| 5,629,707 A | 5/1997 | Heuvel et al. | |
| 5,689,270 A | 11/1997 | Kelly et al. | |
| 5,691,980 A | 11/1997 | Welles, II et al. | |
| 5,752,976 A | 5/1998 | Duffin et al. | |
| 5,758,261 A | 5/1998 | Wiedeman | |
| 5,835,012 A | 11/1998 | Wilk | |
| 5,841,398 A | 11/1998 | Brock | |
| 5,852,604 A | 12/1998 | Cooley et al. | |
| 5,872,810 A | 2/1999 | Phillips et al. | |
| 5,884,142 A | 3/1999 | Wiedeman et al. | |
| 5,955,986 A | 9/1999 | Sullivan | |
| 5,963,157 A | 10/1999 | Smith | |
| 5,969,673 A | 10/1999 | Bickley et al. | |
| 5,982,324 A | 11/1999 | Watters et al. | |
| 5,995,832 A * | 11/1999 | Mallinckrodt | 455/427 |
| 5,999,124 A | 12/1999 | Sheynblat | |
| 6,018,659 A * | 1/2000 | Ayyagari et al. | 455/431 |
| 6,025,774 A | 2/2000 | Forbes | |
| 6,038,263 A | 3/2000 | Kotzin et al. | |
| 6,046,678 A | 4/2000 | Wilk | |
| 6,067,045 A * | 5/2000 | Castelloe et al. | 342/357.09 |
| 6,073,012 A * | 6/2000 | Vanden Heuvel et al. | 455/427 |
| 6,094,162 A | 7/2000 | Sullivan | |
| 6,108,553 A | 8/2000 | Silventoinen et al. | |
| 6,131,067 A | 10/2000 | Girerd et al. | |
| 6,140,956 A | 10/2000 | Hillman et al. | |
| 6,154,171 A | 11/2000 | Sullivan | |
| 6,166,687 A * | 12/2000 | Ishikawa et al. | 342/357.16 |
| 6,169,514 B1 | 1/2001 | Sullivan | |
| 6,177,907 B1 | 1/2001 | Golovin et al. | |
| 6,181,911 B1 | 1/2001 | Sih et al. | |
| 6,181,944 B1 | 1/2001 | Uebayashi et al. | |
| 6,185,427 B1 | 2/2001 | Krasner et al. | |
| 6,188,351 B1 * | 2/2001 | Bloebaum | 342/357.15 |
| 6,195,041 B1 | 2/2001 | Gardner et al. | |
| 6,201,973 B1 * | 3/2001 | Kowaguchi | 455/456.6 |
| 6,208,290 B1 | 3/2001 | Krasner | |
| 6,208,292 B1 | 3/2001 | Sih et al. | |
| 6,236,359 B1 | 5/2001 | Watters et al. | |
| 6,243,648 B1 | 6/2001 | Kilfeather et al. | |
| 6,249,217 B1 | 6/2001 | Forbes | |
| 6,249,245 B1 | 6/2001 | Watters et al. | |
| 6,249,252 B1 | 6/2001 | Dupray | |
| 6,295,449 B1 | 9/2001 | Westerlage et al. | |
| 6,311,128 B1 | 10/2001 | Prum et al. | |
| 6,313,786 B1 | 11/2001 | Sheynblat et al. | |
| 6,313,791 B1 | 11/2001 | Klanke | |
| 6,323,805 B1 | 11/2001 | Zou et al. | |
| 6,330,452 B1 * | 12/2001 | Fattouche et al. | 455/456.1 |
| 6,332,069 B1 | 12/2001 | Zhao et al. | |
| 6,389,291 B1 | 5/2002 | Pande et al. | |
| 6,408,178 B1 * | 6/2002 | Wickstrom et al. | 455/427 |
| 6,411,254 B1 | 6/2002 | Moeglein et al. | |
| 6,418,319 B1 | 7/2002 | Dent | |
| 6,420,999 B1 | 7/2002 | Vayanos | |
| 6,421,002 B2 | 7/2002 | Krasner | |
| 6,433,734 B1 | 8/2002 | Krasner | |
| 6,433,740 B1 | 8/2002 | Gilhousen | |
| 6,437,702 B1 | 8/2002 | Ragland | |
| 6,437,734 B1 | 8/2002 | McBurney et al. | |
| 6,480,788 B2 | 11/2002 | Kilfeather et al. | |
| 6,505,122 B1 | 1/2003 | Vayanos | |
| 6,519,466 B2 | 2/2003 | Pande et al. | |
| 6,525,687 B2 | 2/2003 | Roy et al. | |
| 6,525,689 B2 | 2/2003 | Dooley et al. | |
| 6,529,830 B1 | 3/2003 | Eschebach | |
| 6,531,981 B1 | 3/2003 | Fuller et al. | |
| 6,538,600 B1 | 3/2003 | Richton et al. | |
| 6,539,305 B2 | 3/2003 | Pratt | |
| 6,542,821 B2 | 4/2003 | Krasner | |
| 6,542,823 B2 | 4/2003 | Garin et al. | |
| 6,552,681 B1 | 4/2003 | Hayward et al. | |
| 6,556,832 B1 | 4/2003 | Soliman | |
| 6,560,536 B1 | 5/2003 | Sullivan et al. | |
| 6,603,978 B1 | 8/2003 | Carlsson et al. | |
| 6,611,228 B2 | 8/2003 | Toda et al. | |
| 6,628,232 B1 | 9/2003 | Hynes et al. | |
| 6,633,255 B2 | 10/2003 | Krasner | |
| 6,643,586 B2 | 11/2003 | Allen et al. | |
| 6,657,586 B2 | 12/2003 | Turner | |
| 6,661,372 B1 | 12/2003 | Girerd et al. | |
| 6,665,539 B2 | 12/2003 | Sih et al. | |
| 6,665,541 B1 | 12/2003 | Krasner et al. | |
| 6,665,631 B2 | 12/2003 | Steinbrecher | |
| 6,671,649 B2 | 12/2003 | Kuwahara et al. | |
| 6,684,158 B1 | 1/2004 | Garin et al. | |
| 6,694,142 B1 | 2/2004 | Kuwahara et al. | |
| 6,697,629 B1 | 2/2004 | Grilli et al. | |
| 6,707,422 B2 | 3/2004 | Sheynblat et al. | |
| 6,718,174 B2 | 4/2004 | Vayanos | |
| 6,725,158 B1 | 4/2004 | Kilfeather et al. | |
| 6,725,159 B2 | 4/2004 | Krasner | |
| 6,738,713 B2 | 5/2004 | Pratt | |
| 6,741,935 B1 | 5/2004 | Eschenbach | |
| 6,748,324 B2 | 6/2004 | Patwari et al. | |
| 6,750,814 B1 | 6/2004 | Nir et al. | |
| 6,772,064 B1 | 8/2004 | Smith et al. | |
| 6,782,320 B1 | 8/2004 | Bahder | |
| 6,791,472 B1 | 9/2004 | Hoffberg | |
| 6,799,116 B2 | 9/2004 | Robbins | |
| 6,839,547 B2 | 1/2005 | Nir et al. | |
| 6,844,847 B2 | 1/2005 | Gounon | |
| 6,850,557 B1 | 2/2005 | Gronemeyer | |
| 6,853,910 B1 | 2/2005 | Oesterling et al. | |
| 6,856,904 B2 | 2/2005 | Takano et al. | |
| 7,039,418 B2 | 5/2006 | Amerga et al. | |
| 7,265,668 B1 * | 9/2007 | Brosius | 340/539.22 |
| 2002/0025011 A1 | 2/2002 | Sullivan | |
| 2002/0057733 A1 | 5/2002 | Sullivan | |
| 2002/0064210 A1 | 5/2002 | Sullivan | |
| 2002/0072853 A1 | 6/2002 | Sullivan | |
| 2003/0083816 A1 | 5/2003 | Imakado et al. | |
| 2003/0109988 A1 | 6/2003 | Geissler et al. | |
| 2003/0220737 A1 | 11/2003 | Smith et al. | |
| 2003/0229445 A1 | 12/2003 | Tingley | |
| 2004/0006424 A1 | 1/2004 | Joyce et al. | |
| 2004/0034471 A1 | 2/2004 | Rorabaugh | |

| | | | | | |
|---|---|---|---|---|---|
| 2004/0068367 A1 | 4/2004 | Mitsunaga et al. | | FOREIGN PATENT DOCUMENTS | |
| 2004/0142660 A1 | 7/2004 | Churan | | | |
| 2004/0172195 A1 | 9/2004 | Underbrink et al. | EP | 0856957 A2 | 5/1998 |
| 2004/0192330 A1 | 9/2004 | Gaal | EP | 0874248 A2 | 10/1998 |
| 2004/0203876 A1 | 10/2004 | Drawert et al. | WO | WO 97/14057 A1 | 4/1997 |
| 2004/0220734 A1 | 11/2004 | Gronemeyer | WO | WO 00/14568 A1 | 3/2000 |
| 2004/0225438 A1 | 11/2004 | Draganov | WO | WO 00/58748 A1 | 4/2000 |
| 2004/0246146 A1 | 12/2004 | Fomukong | | | |

* cited by examiner

SYSTEM AND METHOD FOR DUAL-MODE LOCATION DETERMINATION

This application is a continuation-in-part of application Ser. No. 11/030,983, filed Jan. 10, 2005, which is a continuation of application Ser. No. 10/754,492, filed Jan. 12, 2004, which is a continuation of application Ser. No. 10/191,288, filed Jul. 10, 2002 (now U.S. Pat. No. 6,725,158), which is a continuation application Ser. No. 09/984,069, filed Oct. 26, 2001 now (U.S. Pat. No. 6,480,788), which is a continuation-in-part of application Ser. No. 09/351,852, filed Jul. 12, 1999 (now U.S. Pat. No. 6,243,648) U.S. Pat. No. 6,480,788 claims priority to provisional application Ser. No. 60/243,430, filed Oct. 27, 2000. The present application also claims priority to provisional application Ser. No. 60/634,256, filed Dec. 9, 2004. Each above-identified application is incorporated by reference herein, in its entirety, for all purposes.

BACKGROUND

Field of the Invention

The present invention relates generally to methods and systems for tracking the location of devices near the surface of the Earth, and more particularly to a method and system for tracking a device near the surface of the Earth using a very fast acquisition portable transponder.

INTRODUCTION

Various techniques are available to determine the position of a device on the surface of the Earth. U.S. Pat. No. 3,063,048 discloses the use of the Doppler shift in a transmitted signal to determine the position of a device transmitting the signal. This patent teaches measuring when the Doppler shift frequency is changing at a maximum rate to determine the position of the object transmitting the signal undergoing the Doppler frequency shift. In this system, the satellite must continuously receive the signal being transmitted from the object to determine when the frequency is changing at its maximum to locate the object. As a result, the time to compute a position fix is unacceptably long for applications such as locating a satellite telephone.

The Global Positioning System (GPS) also provides geo-location capability. Moreover, it is desirable to know the position of a mobile terminal, such as a cellular telephone, and to have this position information at a central location (e.g., at a Service Operations Center or SOC).

One technique is to place a GPS receiver on the mobile terminal, calculate position in the GPS receiver, and transmit via satellite (or other communications system) the position fix to a central location. This method suffers from the Time-To-First-Fix (TTFF) limit inherent in GPS receivers upon waking up from a cold start. From the cold start state, a GPS receiver must download the GPS satellite almanac, ephemeris, and clock correction information. The TTFF limit effectively eliminates using a GPS receiver in situations where a long TTFF is unacceptable. For example, in wireless or cellular telephone telephony applications, it would not be acceptable to require the user to wait for the mobile terminal (i.e., the wireless or cellular telephone) to download GPS data prior to making a telephone call.

The present invention is therefore directed to the problem of developing a system and method for calculating the position of a mobile terminal, which can be accomplished rapidly using a minimal amount of power and equipment.

SUMMARY

The present invention solves this problem by collecting observation data at the mobile terminal, forwarding the observation data to a central location, and performing the position calculations at the central location rather than at the individual mobile terminal. Thus, the mobile terminal of the present invention needs only to gather a few milliseconds of observation data, such as GPS code phase information, and then relays this observation data to a central station, via satellite or other relay means, for subsequent position calculation. In this manner, the present invention requires that the mobile unit be on only for very brief periods of time, so that a very fast (e.g. 1 second including data transmission time) position solution can be obtained. This would make practical, for example, the geolocation of a phone prior to a call being placed, which is particularly useful in satellite based phone services to control access and call routing decisions. The fast solution and minimal battery drain make practical the employment of a geolocating system in situations that may not otherwise economically justify such use.

According to one aspect of the present invention, a system for determining the location of an object located on or near the surface includes a communication satellite, a satellite gateway or earth station, a mobile terminal, and a service operations center. In this system, the communications satellite broadcasts an interrogation signal, to which the mobile terminal responds. The mobile terminal is disposed on the object, and includes a receiver, a transmitter and a processor. The receiver receives the interrogation signal from the communications satellite, and is capable of receiving signals being broadcast from GPS satellites. The processor measures at least one characteristic in each of the signals being broadcast from the GPS satellites upon receipt of the interrogation signal from the communications satellite. The mobile terminal transmits a reply signal at a predetermined time relative to receipt of the interrogation signal to the communications satellite. The reply signal includes the measured characteristic(s) in each of the signals being broadcast from the plurality of GPS satellites. The operations center receives the reply signal from the communications satellite, and calculates a position of the mobile terminal using time of arrival information and the measured characteristics returned by the mobile terminal.

In the above system, the measured characteristic(s) can include, for example, code phase information, carrier phase information, Doppler-shift information, or bit phase information. Code phase measurements alone are insufficient to unambiguously identify the position of the mobile terminal. The service operations center requires additional information to constrain the position solution. One means for constraining the position solution is to determine the range from the terminal to the communications satellite.

For this reason, in the first aspect of the present invention, the service operations center includes a processor that calculates a range between the communications satellite and the mobile terminal. In this calculation, the processor uses a time the reply signal arrived at the satellite gateway and a time difference between the broadcast of the interrogation signal to the mobile terminal and its receipt at the satellite gateway. To do so, the processor accounts for known delays in the signal path between the communications satellite and the mobile terminal and the point at which the time-of-arrival information is measured at the satellite gateway. The processor also calculates an intersection curve between a sphere, whose radius is the range previously determined, and a model of the surface of the Earth. Furthermore, the processor determines several initial points on the intersection curve, one of which points must lie within a known convergence zone around the terminal. Next, the processor calculates candidate position solutions for each initial point, and then screens the candidate solutions using predetermined criteria and discards any candidates not satisfying the screening. Finally, if more than one candidate solution remains, the processor selects the solution representing a best fit of all the observation data.

In the above system, the predetermined criteria may include one or more selected of the following: a solution range to the communications satellite, solution residuals, a solution altitude, a solution clock bias and a solution proximity to a beam boundary.

Not all types of communications systems provide the ability to measure propagation delay from a known site such as the satellite. A second preferred embodiment of the present invention solves the problem existing in the art by sending additional signal-related information as data to the SOC along with the code phase measurements. In the second preferred embodiment of the present invention, the additional signal-related information is a signal characteristic such as observed carrier frequency or observed Doppler shift of the carrier frequency. In addition to the measurement of the signal characteristic, in the preferred embodiment of the present invention, the time that the signal characteristic is measured is sent to the SOC. Alternatively, the time that the signal characteristic is measured is estimated from the time the message containing the observed data is received by the SOC. The code phase measurements are obtained at the GPS receiver, for example, in a cellular telephone. These measurements are sent to the SOC. In addition, the carrier frequency of the GPS signal sent by each of the GPS satellites is measured and sent to the SOC. The set of carrier frequency measurements form a set of observed carrier frequencies.

Using the carrier frequencies and a general region containing the location of the receiver candidate locations are determined. The candidate locations are determined by searching in the general region for points in the general region that are consistent with the observed carrier frequencies. From this set of candidate locations, the position of the mobile terminal is determined using the code phase measurements. The position is that candidate location that minimizes a set of residuals calculated using the code phase measurements. It can be seen that the second preferred embodiment of the present invention does not require a satellite (other than the GPS satellites) for operation.

Thus, one object of the present invention is to determine a location of a mobile terminal using a SOC.

Another object of the present invention is to reduce the power requirements of a mobile terminal in order to determine its position.

Another object of the present invention is to reduce the time required for a mobile terminal to be powered on so that its position can be determined.

Another object of the present invention is to increase the speed of acquisition of information required to determine the position of a mobile terminal.

Another object of the present invention is to perform calculations required to determine the position of a mobile terminal on a device other than the mobile terminal.

Another object of the present invention is to provide a location of a mobile terminal using a SOC without having control of the communication channel over which measurement data is sent from the mobile terminal to the SOC.

Another object of the present invention is to provide a location of a mobile terminal using a SOC with little or no change to the communication channel over which measurement data is sent from the mobile terminal to the SOC.

Another object of the present invention is to provide location of a mobile terminal by performing position calculations in a SOC and not in the mobile terminal.

Another object of the present invention is to provide a ground-based (i.e., terrestrial) technique for determining position of a mobile terminal using GPS satellite measurements.

Another object of the present invention is to provide dual-mode location determination.

These and other objects of the present invention are described in greater detail in the detailed description of the invention, the appended drawings and the attached claims.

DETAILED DESCRIPTION

Figure 1:
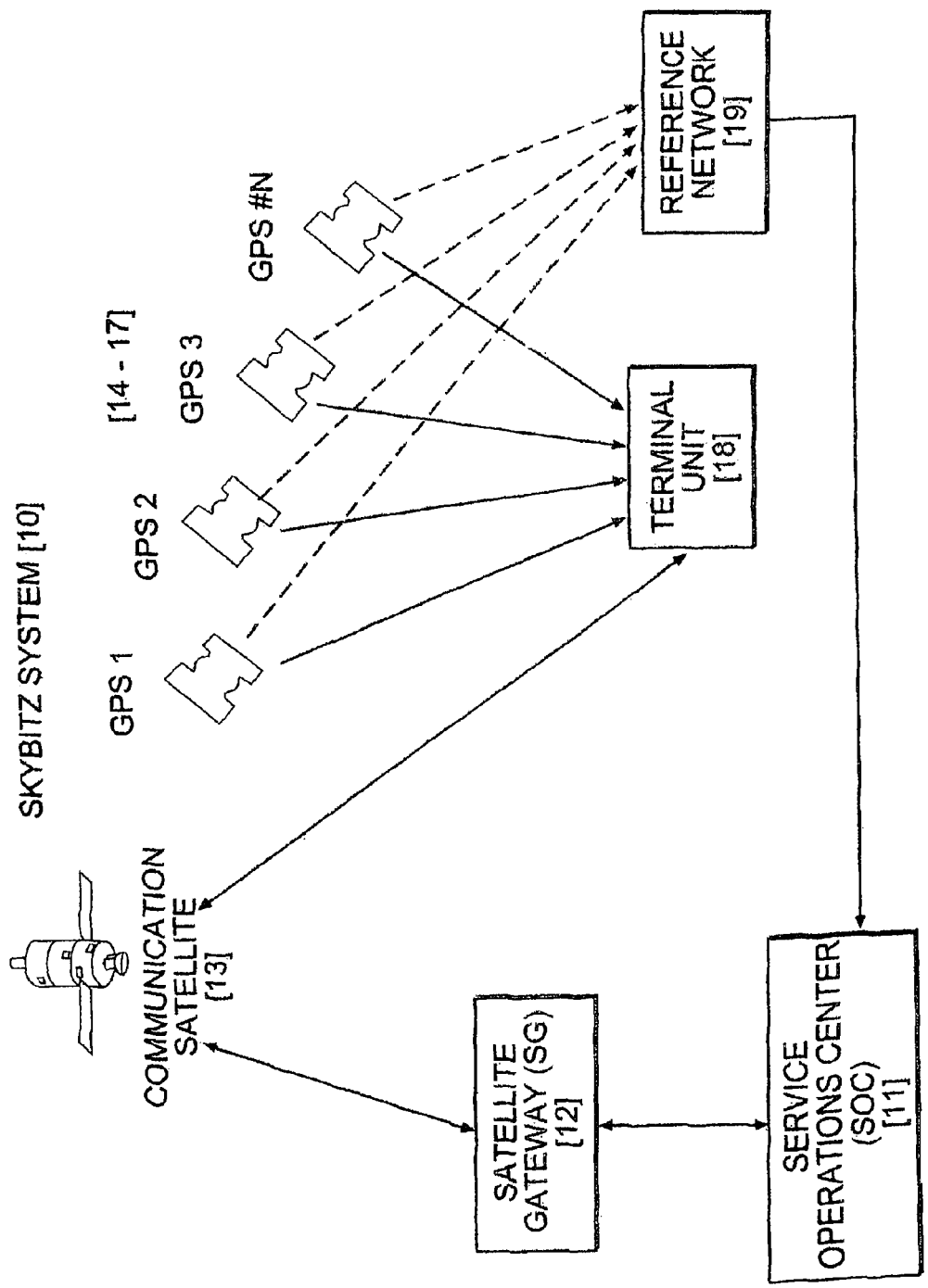
FIG. 1 depicts a block diagram of an exemplary embodiment of a system according to the present invention.

Referring to FIG. 1, an exemplary embodiment of a system [10] includes a Service Operations Center (SOC) [11], which is coupled to a Satellite Gateway (SG) [12], a communications satellite [13], satellites in the Global Positioning System (GPS) [14-17], a terminal unit [18], and a Reference Network (RN) [19]. The terminal unit [18] receives signals from multiple GPS satellites [14-17], and the communications satellite [13].

The terminal unit [18] receives a broadcast message on its forward communications satellite link, which broadcast message contains timing and acquisition aiding information. Following receipt of the message, the terminal unit performs its observation data collection function, and then transmits back to the SOC the observation data, along with any necessary system and/or status information, at a fixed delay from the received broadcast information. All processing of the observation data is done at the SOC [11]. The terminal unit [18] merely takes measurements and returns the observations as part of the broadcast/response cycle.

Service Operations Center

The SOC [11] controls the operation of the system [10] of the present invention. The SOC [11] broadcasts a signal on the forward link which contains timing and acquisition aiding information that can be received and used by the mobile terminals to synchronize time and to rapidly acquire their intended GPS signals, from which they take their observation data set. The forward broadcast can also contain command and control protocols for individual and/or groups of terminals.

The return signal from the terminal [18] includes the observation data along with any system, status or protocol information necessary to operate the system.

The return signal is synchronized to the forward signal by a specific and known delay, which allows the Satellite Gateway [12] to take an additional measurement of the round-trip signal propagation time and absolute Time-of-Arrival (TOA).

This calculated propagation time is used along with certain observation data to determine position. The SOC also collects, on a continuous basis, all ancillary information necessary to the position calculations from a Reference Network [19] and other sources. As an example, this information includes:

1. GPS broadcast ephemerides and clock correction coefficients for all satellites in view over the region of interest;
2. Current GPS Almanac;
3. Current ionospheric and tropospheric parameters;
4. Current Status messages and advisories;
5. Current communications satellite state vector and operational status; and
6. Differential correction data (if used).

Satellite Gateway

The Satellite Gateway [12] consists of satellite communications modems (channel units) and associated control and management equipment and software. The gateway maintains an accurate time and frequency reference for control of the forward link broadcast, and for propagation time measurements. The terminal needs only to accurately respond relative to the forward signal and therefore can use a much less accurate, and low power, internal reference. The satellite gateway [12] is a traditional satellite communications facility. Therefore it also includes antenna, transmitter, amplifier, up/down conversion, and other standard satellite communications equipment and software that is not shown, but is known to those of skill in this art.

Communications Satellite

The communications satellite can be any (LEO, MEO, GEO) satellite capable of transponding the forward and return signals to/from the terminal and satellite gateway. It could also be a balloon, airplane, remotely piloted vehicle or other aircraft operating within the atmosphere (Non-Bent pipe satellites can also be used if all delays in the transmission path are known and removed). The Satellite (or aircraft) position and velocity information, as well as transponder group delay and other operational parameters must be known. Examples of suitable communications satellites include:

1. Orbcomm
2. Globalstar
3. ICO
4. AceS
5. Hughes MSAT
6. Thuraya
7. Iridium

Other communications satellites are possible for use in the present invention, which satellites are known to those of skill in the art.

Terminal Unit

The present invention only requires that the mobile terminal [18] receive a signal, make observations (measuring certain aspects of the GPS signals), and return another signal, which includes the observation data, and can be accomplished over a very short interval. There are various types of observation data that can be relayed to the central site to enable the central site to determine the position of the mobile terminal.

One possibility is to collect code phase and/or carrier phase information inherent in the GPS signal. This enables the mobile unit to remain on for a very short time, thereby helping to minimize the Time-To-First-Fix. Other signal characteristics that can be measured by the terminal are Doppler-shift information, or bit phase information. Another possibility is to digitize a brief interval of the received GPS signal and transmit the digital data to the central site. The central site can then reconstruct the received signal, and determine the position based on certain characteristics in the received signal, such as Doppler shift, code phase of arrival of the received signal, bit phase information, etc.

Exemplary Embodiment of a Method of the Present Invention

The following provides an exemplary embodiment of the present invention, in which Code Phase of Arrival (COA) information is used to determine the position of the mobile terminal. Other measurements are also possible, as stated above.

Figure 2:
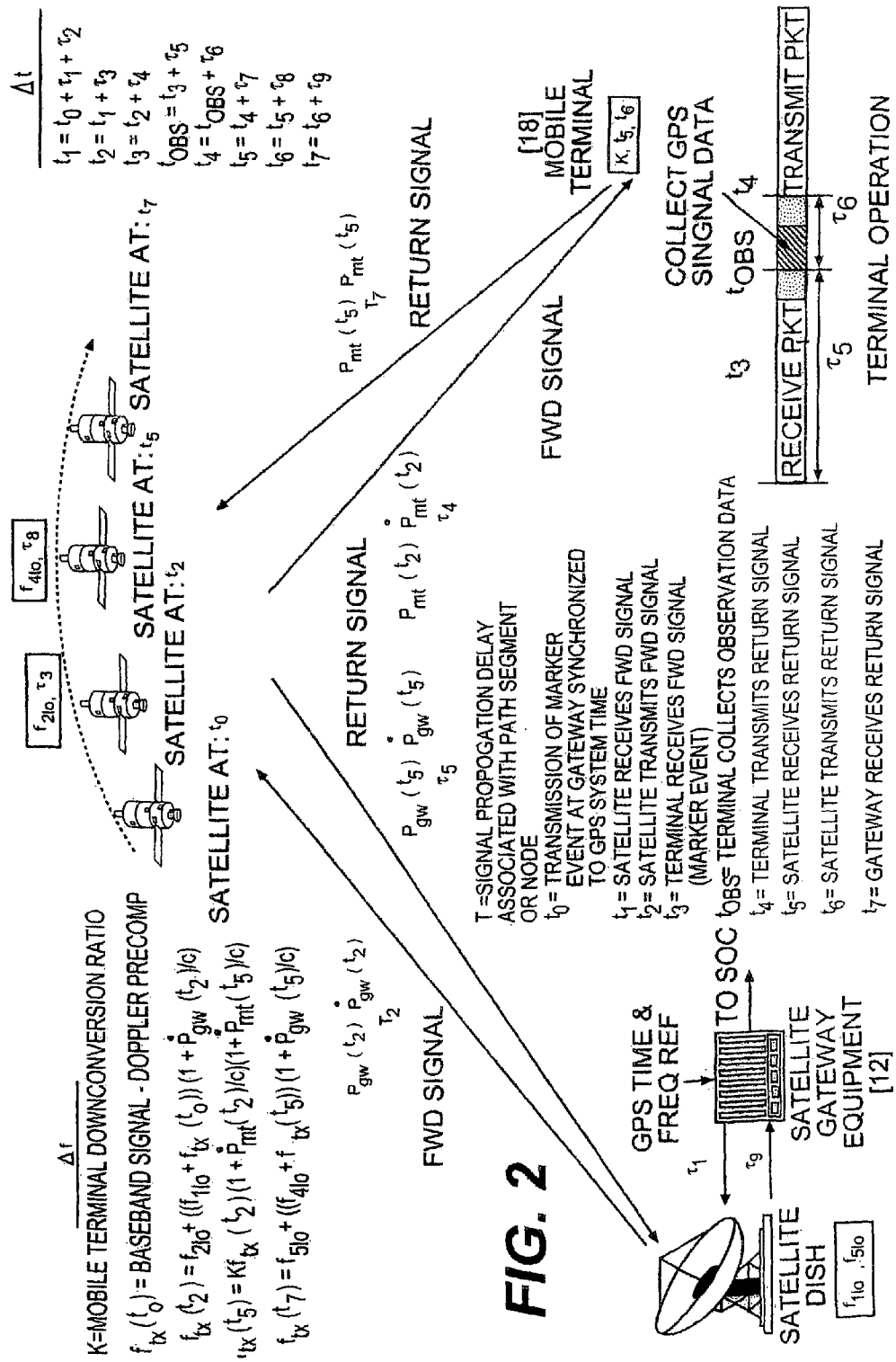
FIG. 2 depicts a diagram of an exemplary embodiment of the method according to the present invention.
Figure 3:
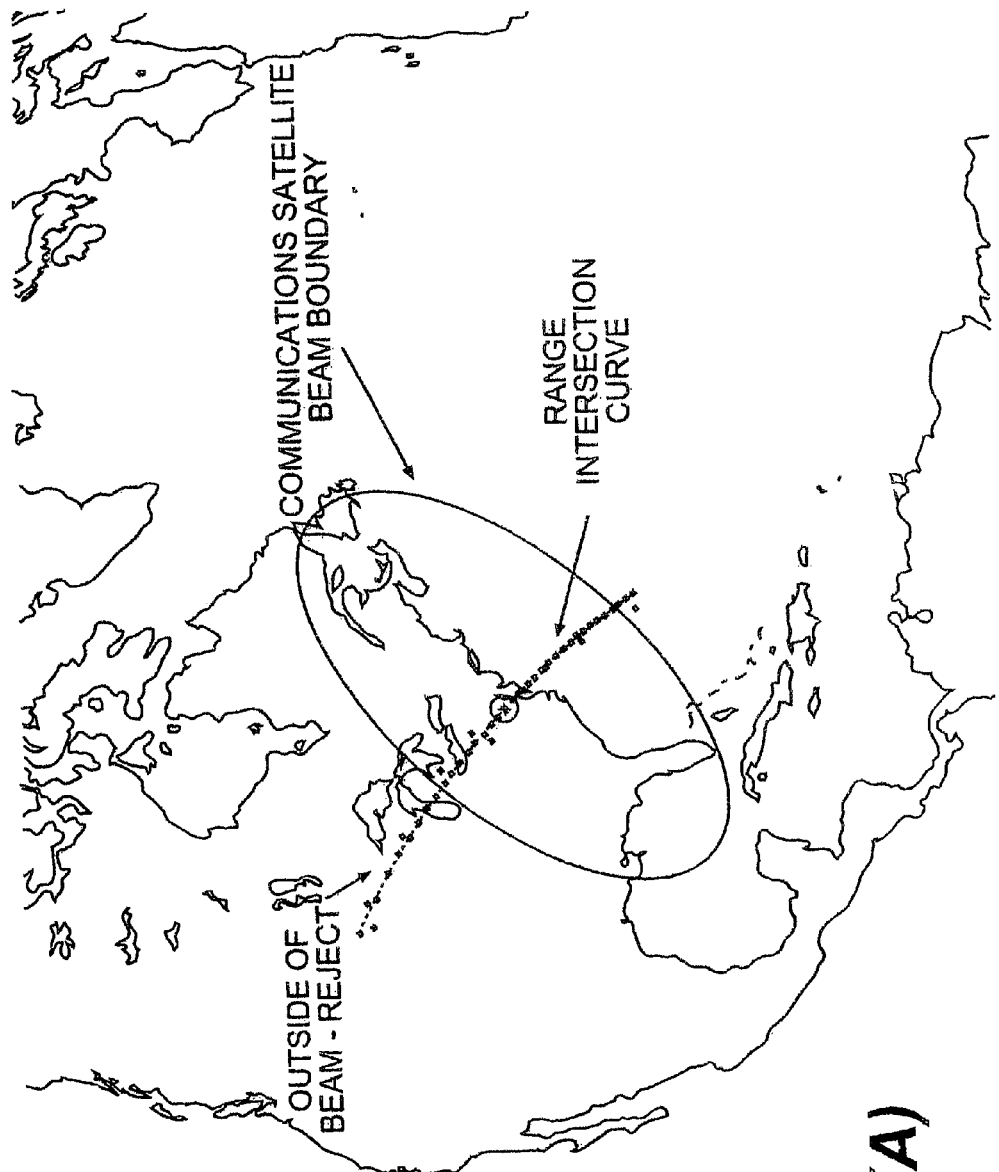
FIGS. 3(a) and 3(b) depicts a geographical representation of the method of FIG. 2 used to locate a terminal unit according to the present invention.

Referring to FIG. 2, at time t0, a Satellite Gateway (SG) [12] transmits a forward signal, with a marker event, through a communications satellite [13] to a region of the Earth bounded by the satellite beam pattern as in FIG. 3. An example of a marker event is a synchronization data pattern in the packet preamble.

Depending on the communications satellite employed, multiple regions may be covered by different beams. Consequently, signals may be transmitted to these regions either in sequence or simultaneously.

The satellite [13] receives the signal at time $t_1$, and retransmits the signal back to earth at time $t_2$. Subsequently, at time $t_3$ the mobile terminal [18] receives the signal with the marker event.

When the mobile terminal [18] needs to report its position, it searches for the SG signal in the satellite downlink. This signal contains information to aid acquisition (e.g., a prioritized list of GPS satellite vehicles in view over the coverage region, Doppler offset information, timing reference, etc.). Satellite vehicles in the list are prioritized to allow the mobile terminal [18] to search for and select those satellites that provide a favorable observation set of GPS satellites (i.e., to minimize dilution of precision, exclude degraded or non-operational satellites, etc.). The SG [12] also synchronizes the outbound transmission relative to a GPS timing reference.

Using the acquisition information recovered from the forward message, the mobile terminal [18] receives a multitude of GPS signals starting at time $t_{obs}$, which is a fixed and known time interval from $t_3$. The operation of the receiver is synchronized with the signal received from the SG [12]. In turn, the signal received from the SG [12] is synchronized to GPS time (such as the X1 epoch). Consequently, the receiver clock offset associated with the GPS spreading codes used to recover the signals can be estimated back at the ground station with reasonable (less than +/−0.5 milliseconds) accuracy.

The terminal [18] measures the Code Phase of Arrival (COA) of each of the GPS signals at $t_{obs}$. The terminal [18] then relays this measurement to the SG [12] by transmitting a return signal back through the communications satellite at time $t_4$, which also has a fixed and known relationship to the inbound timing reference $t_3$.

The communications satellite [13] receives the return signal from the mobile 2 terminal at time $t_5$ and retransmits the same signal back to the SG [12] (or another ground station) at time $t_6$. The return signal is received by the SG at time $t_7$ and compared to the forward link timing reference and a round-trip propagation time measurement is taken. Absolute Time of Arrival (TOA) measurements are also taken. The SG [12] recovers the contents of the return transmission and forwards the 30 data along with its propagation time and TOA measurements to the SOC [11].

Exemplary Embodiment of Position Determination Calculations Performed at Service Operations Center SOC [11] calculates the magnitude of the range vector between the communications satellite [13] and the terminal [18] by removing all known delays from the propagation time measurement. This is accomplished using the communications satellite position, velocity and transponder group delay information, the Satellite Gateway antenna position, known signal delays in the ground cable/equipment path, and if desired, any atmospheric or other transmission path delays that can be modeled. These delays and the relationships between the times are depicted in FIG. 2. This range calculation is fairly standard and common practice in the satellite communications field, and would be known to those of skill in the art.

After the range between the communications satellite [13] and the terminal [18] is determined, the SOC [11] determines an arc of possible locations. This is determined by computing an intersection curve 31 (see FIG. 3) of a sphere, centered at the communications satellite having a radius given by the calculated range from the satellite [13] to the terminal [18], with a model of the surface of the Earth.

The Earth can be modeled as a mathematical approximation, such as an ellipsoid, or a geoid model, or with Terrain Elevation Data. The following is one possible example of these calculations using an ellipsoid model:

The Earth can be modeled as an ellipsoid of revolution. The ellipsoid parameters depend on choice of reference frame (e.g., WGS-84). This surface can be expressed:

$$\frac{x^2}{a^2} + \frac{y^2}{a^2} + \frac{z^2}{b^2} = 1$$

Where a and b are constants representing axes of the chosen ellipsoid.

One possible parameterization of the ellipsoid surface could be:

$x = a \sin(\phi)\cos(\lambda)$
$y = a \sin(\phi)\sin(\lambda)$
$z = b \cos(\phi)$
$\phi=0$ to $\pi$ with 0 being the positive z-axis. And $\lambda=0$ to $2\pi$ with 0 being the positive x-axis The equation of a sphere at point $(X_s, Y_s, Z_s)$ with radius $\rho$ (slant range):

$(X-X_s)^2 + (Y-Y_s)^2 + (Z-Z_s)^2 = \rho^2$

Substituting the Ellipsoid equation into the Sphere equation and simplifying gives:

$(a \sin(\phi)\cos(\lambda) - X_s)^2 + (a \sin(\phi)\sin(\lambda) - Y_s)^2 + (b \cos(\phi) - Z_s)^2 = \rho^2$ $(b^2-a^2)\cos(\phi)^2 - 2a \sin(\phi)\cos(\lambda)X_s - 2a \sin(\phi)\sin(\lambda)Y_s - 2b \cos(\phi)Z_s = \rho^2 - a^2 - r^2$ Organizing the coefficients to allow a 'choose Phi - - - solve Lambda' Scenario:

$A = -2a \sin(\phi)X_s$ $B = -2a \sin(\phi)Y_s$ $C = (b^2-a^2)\cos(\phi)^2 - 2b \cos(\phi)Z + r^2 + a^2 - \rho^2$ $A \cos(\lambda) + B \sin(\lambda) + C = O$ Choosing Phi over the range of interest, calculating coefficients, and solving for Lambda gives:

$$\lambda = 2\tan^{-1}\left[\frac{(B \pm \sqrt{B^2 + A^2 - C^2})}{(A - C)}\right]$$

Figure 3B:
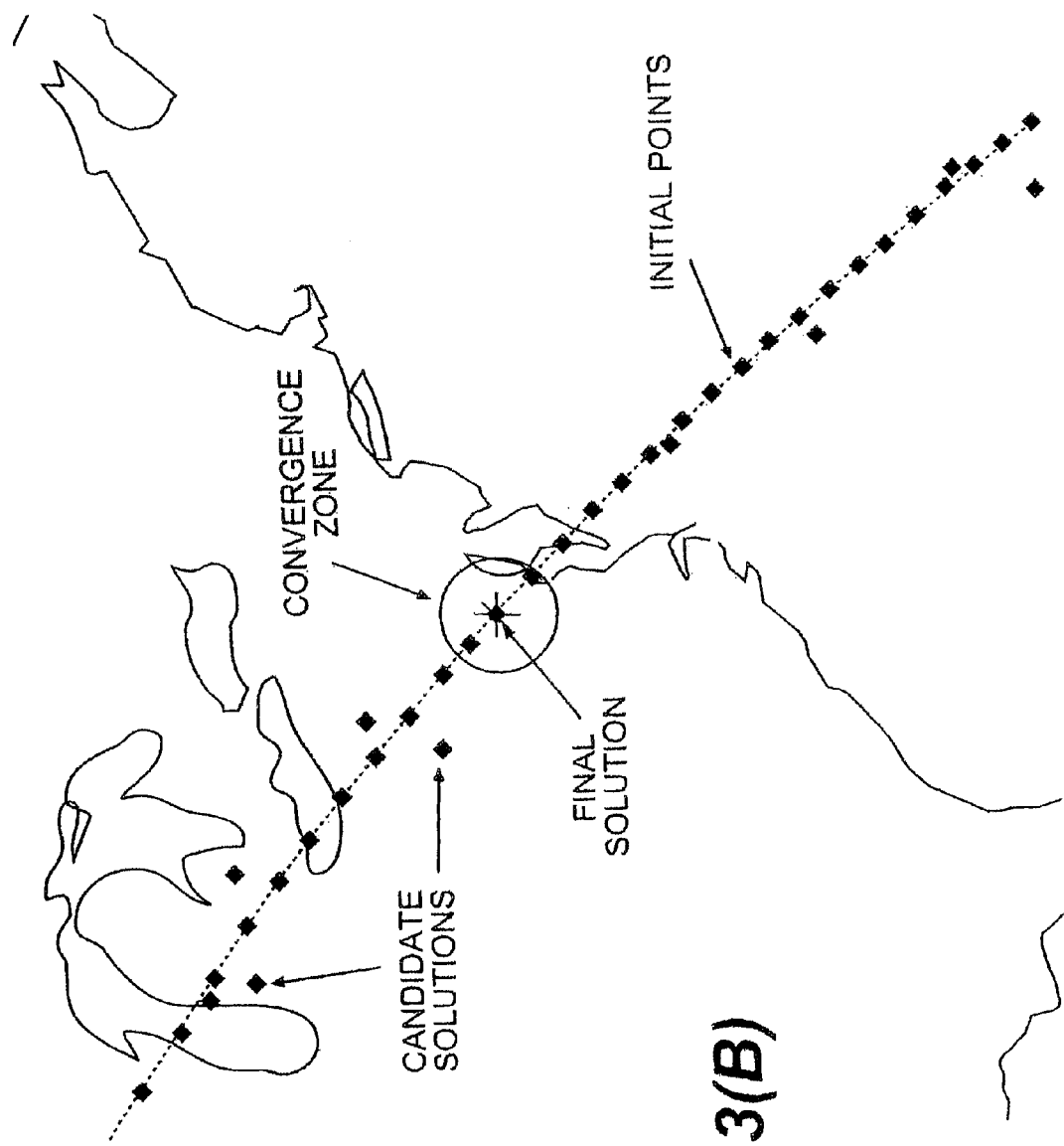

The spacing of points on the parameterized intersection curve depends on spacing of chosen points $\phi$ and the earth model chosen and is depicted in FIG. 3(b). The choice of parametrization method need only guarantee that at least one of the initial points will fall within the convergence zone around the true solution. As used herein, convergence zone refers to the area around the location of the mobile terminal in which a point must lie to guarantee that the position calculation will converge to that location. The size of the convergence zone will vary depending on number, quality and type of observation data used, but as an example, the convergence zone for the code phase observations is approximately a radius of 75-80 Km (See FIG. 3(b)).

One could also use a Geoid model or digital terrain information to construct a similar arc of points by keeping only those points with a range to the communication satellite that is within a certain tolerance.

Points could be sub-sampled or interpolated as desired due to the fact that these only represent a first approximation as input to the least squares algorithm. It is only required that at least one point on the arc lay within the guaranteed convergence zone around the true solution.

Only that portion of the arc within the region of the Earth bounded by the satellite beam pattern is retained by the SOC. Refer to FIG. 3(a), which depicts the bounding of the arc (or parameterized intersection curve) by the beam pattern.

The SOC next determines the time that the mobile terminal collected the GPS signal ($t_{obs}$). The collection time is determined from the range between the satellite and the terminal and SG. The known delays in the transmission paths (i.e., transponder group delay, atmosphere, etc.), the terminal collection method (i.e., fixed delay from $t_3$ and integration period), and the absolute TOA measurement.

The SOC then employs a satellite orbit model to estimate the positions of the GPS satellites at their time of transmission ($t_{xmt}$). GPS $t_{xmt}$ is calculated from $t_{obs}$ less the GPS signal transit time (user must also correct for earth rotation during signal transit time if working in Earth fixed coordinates).

Using each point on the arc as an initial guess, an iterative least squares technique fits the observation data to the predicted data and minimizes residual error. One example of these calculations follows:

Create system of linearized normal equations for least squares solution.

$$-\frac{X^k - X^0}{(P_i^k)^0}x_i - \frac{Y^k - Y^0}{(P_i^k)^0}y_i - \frac{Z^k - Z^0}{(P_i^k)^0}z_i + c\Delta t_i = (P_i^k)_{obs} - (P_i^k)^0 - \varepsilon_i^k$$

-continued $$(P_i^k)_{obs} - (P_i^k)^0 = b_i$$
$$A\hat{x} = b - \epsilon$$

We assume the code observation $P_{obs}$ is corrected for the clock offset of the satellite according to the broadcast ephemerides (and atmospheric delays if desired). The preliminary value $P_0$ is calculated from the initial coordinates of the satellite and from the arc of points generated previously. First guess at receiver clock offset can be estimated from broadcast signal timing and slant range to the terminal. Alternately, an additional observation may be taken to guarantee a unique solution if receiver clock offset cannot be estimated to within 0.5 msec.

$$\begin{bmatrix} -\frac{X^1 - X_i}{\rho_i^1} & -\frac{Y^1 - Y_i}{\rho_i^1} & -\frac{Z^1 - Z_i}{\rho_i^1} & 1 \\ -\frac{X^2 - X_i}{\rho_i^2} & -\frac{Y^2 - Y_i}{\rho_i^2} & -\frac{Z^2 - Z_i}{\rho_i^2} & 1 \\ \vdots & \vdots & \vdots & \vdots \\ -\frac{X^m - X_i}{\rho_i^m} & -\frac{Y^m - Y_i}{\rho_i^m} & -\frac{Z^m - Z_i}{\rho_i^m} & 1 \end{bmatrix} \begin{bmatrix} x_i \\ y_i \\ z_i \\ c\Delta t_i \end{bmatrix} = b - \varepsilon$$

$$\begin{bmatrix} x_i \\ y_i \\ z_i \\ c\Delta t_i \end{bmatrix} = (A^T C A)^{-1} A^T C b$$

The right side of the normal equations b represents the difference between the expected and observed code phase (modulo 1 msec) and is ambiguous. The receiver clock offset is also treated as a modulo 1 msec value. The integer ambiguity is assumed by the choice of preliminary coordinates. Matrix b is kept in 5 the +/−0.5 msec range as a difference between two modulo 1 msec values. This forces convergence to a solution within ~150 Km from the preliminary coordinates. Matrix C is the weight matrix (inverted covariance matrix) derived from signal strengths and/or GPS satellite URE (User Range Error) values and is used in a weighted least squares solution, or set to the identity matrix for a non-weighted solution. Matrix r is the residuals matrix and can be weighted and/or summed, or analyzed as a covariance matrix with minor manipulation.

After convergence, this estimated position solution is then screened against the measured range to the communications satellite (with known tolerance), satellite beam boundaries, an acceptable altitude range (with respect to the ellipsoid, geoid or elevation model used), an acceptable receiver clock offset range, and a maximum residual threshold. Those position estimates not meeting these criteria are discarded. An example for each method follows:

Range: The initial estimate(s) lie on an arc of constant range from the communication satellite. If the candidate solution lies outside the known tolerance of this range estimate then it is discarded.

Altitude: The initial estimate(s) lie on the chosen earth model surface. If the candidate solution lies above/below the maximum/minimum height possible relative to this earth model then it is discarded.

Beam: The initial estimate(s) lie within the beam coverage footprint. If the candidate solution lies outside the beam boundary it is discarded.

Clock Bias Tolerance: The calculated receiver clock bias must fall in the range of the estimated clock bias (with known tolerance) from the propagation time measurement. If the candidate solution falls outside this range it is discarded. Therefore, as the accuracy on the propagation time measurement increases, this becomes a more valuable discriminator.

Residuals: It has been observed that the residuals (goodness of fit) for the converged solutions (for an overdetermined problem) are smallest for the true position estimate. The residuals provide an effective discriminator between ambiguous position solutions when the above least squares method is used. Therefore, an empirically determined or calculated threshold can be used (alone or in conjunction with the other screening criteria) to screen false candidates.

Doppler: The observed Doppler can be compared with the expected Doppler at each of the candidate points. Candidate points falling outside a pre-determined screening criterion are discarded. One such criterion is the sum of the square of the differences criterion. At each candidate point, the sum of the squares of the differences of the measured and calculated Doppler is determined. This calculation is compared against a pre-determined threshold. Those candidate points for which the calculation exceeds the threshold are discarded.

The remaining position estimate(s) can then be improved by using Atmospheric (Ionospheric and/or tropospheric) corrections to the code phase observations to further improve the position accuracy of this process (if desired), and then subjected to a final screening and residual comparison. (e.g., minimum RMS) and the best point selected. Other screening criteria could be employed based on geospatial data sets, or application specific criteria (e.g., must be over land, or near a rail line, etc.).

It should be noted that if the area of interest is small enough (i.e., within the 20 guaranteed convergence zone), such as a very narrow satellite beam, an area or city covered by an aircraft platform or a mobile telephone network, or a cellular tower coverage zone, then the additional range measurement and the screening process are unnecessary, and a unique solution will result from an initial estimate at the center of the area of interest.

Well known differential correction (DGPS) techniques can be applied to the final correct position to further increase its accuracy since all the same error sources in a standard GPS solution apply here as well.

Figure 4:
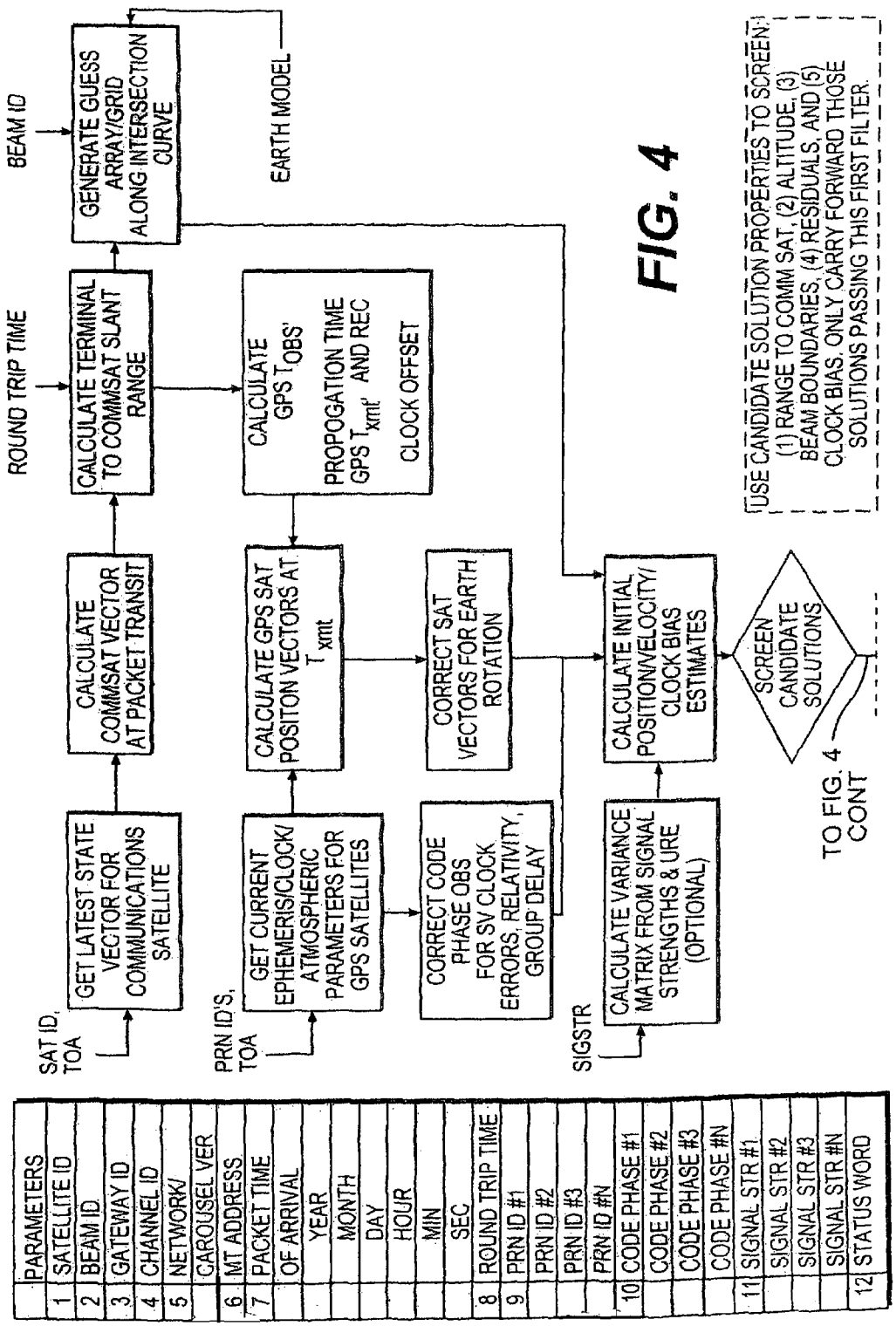
FIG. 4 depicts the various parameters returned to the Service Operations Center and used in calculating the position solution, and a flow chart of the calculations performed by the processor in the SOC.
Figure 4:
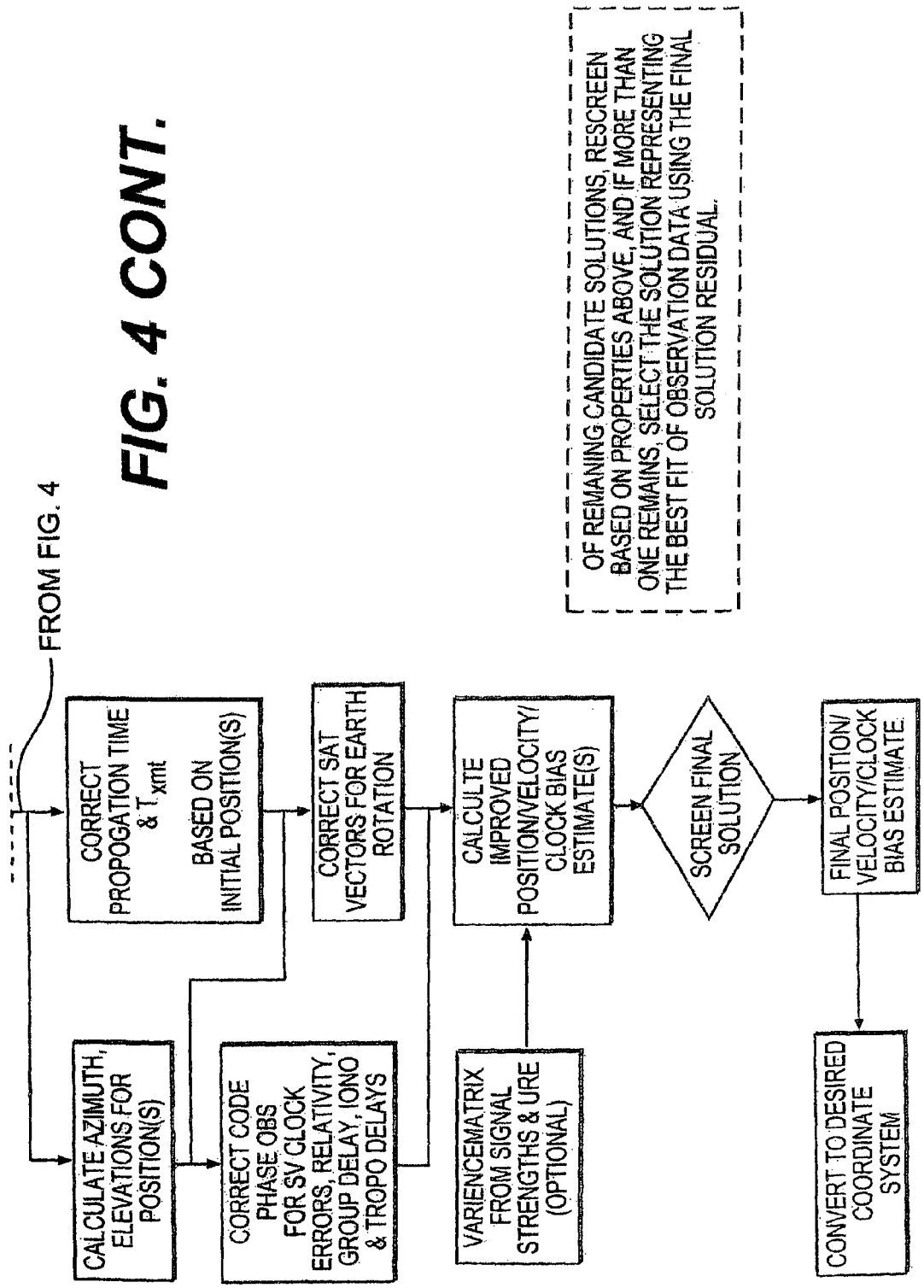

FIG. 4 depicts the above calculations performed by a processor in the SOC [11] in flow chart form, which is suitable for implementing in software for execution on a general purpose computer. Upon receipt of the information packet at the SOC [11] containing the observation data from the terminal [18] and the measurement and ancillary data from the SG [12], the SOC processor obtains the latest state vector for the communication satellite [13], and the ephemeris, clock and atmospheric data for the GPS satellites [14-17].

The SOC [11] then performs a series of calculations as shown in the flow diagram resulting in several candidate position solutions. The candidate solutions are then screened per the criteria described previously, and another iteration is performed which can include the atmospheric correction data. If there is more than one remaining solution then a final screen and selection takes place. The final position obtained can then be converted to the desired coordinate system.

In a second preferred embodiment, the present invention uses timing correction information generated by communication satellite systems to synchronize data transmission from multiple mobile terminal to avoid overlapping data transmissions. For example, systems using TDMA protocols, such as GSM systems generate timing correction information that is used to adjust data transmission timing of a plurality of mobile terminals to avoid data from one mobile terminal overlapping a time slot assigned for data from another mobile terminal. TDMA systems have signal structures containing a plurality of time slots. Each of the time slots is assigned to a particular mobile terminal or is used for some other purpose. One problem with such systems is that due to different propagation delays between various mobile terminals and the communication satellite, a data packet sent from one mobile terminal can overlap with the time slot assigned to another mobile terminal. To avoid this data packet overlap, TDMA systems provide synchronization information to each of the mobile terminals to avoid data packet overlap.

Figure 5:
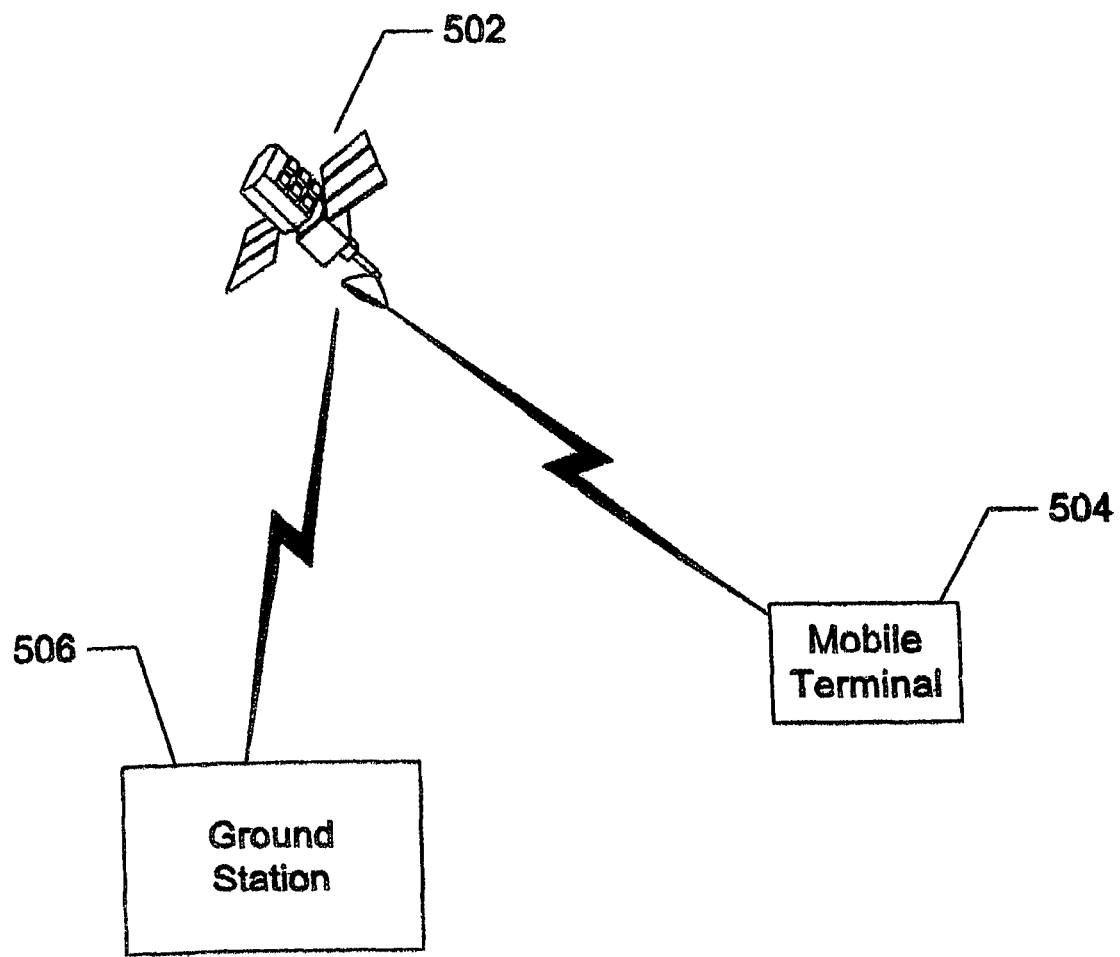
FIG. 5 is a schematic illustration of an exemplary embodiment of a system according to a second embodiment of the present invention.

FIG. 5 illustrates a communication system according a second embodiment of the present invention. A communication satellite 502 transmits a forward control packet to a mobile terminal 504. Typically, the forward control packet includes information regarding the time slot in which the mobile terminal can send an access request to communication satellite 502. Mobile terminal 504 receives the forward control packet and synchronizes to it. At the appropriate time, mobile terminal 504 transmits an access request to communication satellite 502. Communication satellite 502 receives the access request and measures the timing of the received access request with respect to the forward control packet's timing. The measured timing is compared to an internal reference. Based on this comparison, timing correction information is generated. The timing correction information is used to adjust data transmission timing of mobile terminal 504 so that data packets it sends are received by communication satellite 502 properly aligned in the appropriate time slot of the reverse channel. Communication satellite 502 transmits a response message to mobile terminal 504 containing the timing correction information. Mobile terminal 504 receives the response containing the timing correction information. Using the timing correction information, mobile terminal adjusts its transmitter timing. This adjustment is to advance, delay or maintain the transmitter's timing. Mobile terminal 504 then sends the GPS code phase data and the timing correction information to communication satellite 502 to be sent to a ground station 506. Ground station 506 receives the GPS code phase information and the timing correction information. Ground station 506 then relays this information to a service operation center (described above), where it is used to determine position of the mobile terminal. Alternately, ground station 506 can initiate the transmission of the forward control packet, receive the access request, compare it to an internal reference and determine the timing correction information.

The timing correction information is a measure of the propagation delay from the mobile terminal to the communication satellite. A range arc (described above) is determined using the propagation delay. The range arc has communication satellite 502 at its origin. Determination of the range arc using the propagation delay between mobile terminal 504 and communication satellite 502 is well known to those skilled in the art. This range arc is used to determine position as described above. Consequently, the range arc determined from the propagation delay corresponding to the timing correction information determined as part of the communication satellite's protocol is used as an input to the range ambiguity resolution technique described above.

Mobile terminal 504 can alternatively be programmed to send the timing correction information along with GPS code phase measurements to the SOC. The SOC uses this information to determine the mobile terminal's position. Modifying mobile terminal 504 to send this data to the SOC eliminates the need to modify or augment existing ground station equipment to provide these timing measurements directly to the service operations center.

As described, a mobile terminal is generally designed to forward information to an SOC for determination of the mobile terminal's location. As noted above, if the area of interest is small enough, such as a very narrow satellite beam, an area or city covered by an aircraft platform or a mobile telephone network, or a cellular tower coverage zone, then the position determination process at the SOC can be simplified since a unique solution will result from an initial estimate at the center of the area of interest.

For example, in one embodiment, a mobile terminal can be designed to obtain a location area identifier (LAI) from a broadcast control channel (BCCH) in a mobile telephone network that carries system and cell specific information. As defined in the IS-95 standard, the LAI includes a country code (CC), a mobile network code (MNC), and a location area code (LAC). This LAI information can be received by the mobile terminal and forwarded at least in part to the SOC as an initial estimate of the mobile terminal's position. For example, if the LAI information identifies a city or a town, then the SOC can use the center of the identified city or town as the initial estimate of the mobile terminal's position. As would be appreciated, the specific type of LAI information that would be received would be dependent on the particular implementation of the mobile telephone network.

Significantly, if the area of interest identified by the LAI information is smaller than the convergence zone, then a true position solution will result without the use of further screening procedures. If the area of interest identified by the LAI information is larger than the convergence zone, then additional candidate solutions and subsequent screening procedures may be needed. For example, if a range arc from a communication satellite is available, then two candidate solutions on the range arc that bound the LAI-produced position estimate could also be used in the position determination process. Alternatively, if a range arc is not available, then a small sample of candidate solutions that bound the LAI-produced position estimate on a defined grid could be used.

In one embodiment, the mobile terminal could be designed to "sniff" the LAI information over the air without any intent of communicating voice traffic over the mobile telephone network. In this manner, the mobile terminal could be designed primarily for communication with a satellite communication network. The LAI information would therefore represent only an additional piece of information that would be forwarded to the SOC via the satellite communication network. In effect, the mobile terminal would leverage information freely obtainable from a mobile telephone network without actually requiring the hardware in the mobile terminal to fully use the mobile telephone network.

In another embodiment, the mobile terminal could be designed to operate in a dual-mode capacity. In one embodiment, the mobile terminal could be designed to communicate with an SOC through either a satellite communication network or through a mobile telephone network. In either capacity, the mobile terminal could communicate enough information to enable the SOC to determine the mobile terminal's location. In one mode, the mobile terminal would communicate GPS observation data to the SOC via a communication satellite as described above. The communication could also include location area information obtained from any available source, including a mobile telephone network. In a second mode, the mobile terminal would communicate GPS observation data to the SOC via a mobile telephone network. In this mode, the mobile terminal would forward GPS observation data to the SOC along with location area information (e.g., LAI or base station identifiers) that would naturally be received through the use of the mobile telephone network.

In this dual-mode solution, the mobile terminal's location could be determined through the use of complementary communication networks. Indeed, it is envisioned that a mobile terminal may have part-time visibility to either network, but full or close to full-time visibility to the collective pair of networks. A complete asset tracking and monitoring solution can therefore be produced that enables full-time visibility of an asset.

In one embodiment, the mobile terminal could selectively communicate with the supporting communication networks. For example, the mobile terminal could prefer to communicate using one network with the other network providing a backup function. A determination would then be made as to whether the mobile terminal was in view of a particular communication network. In another embodiment, the mobile terminal could be designed to communicate with both networks simultaneously to provide redundancy in the SOC's receipt of position determination information.

As would be appreciated, additional communication modes could also be defined to provide further redundancy in the communication of information.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A location determination method in a mobile terminal, comprising
   a. taking a plurality of observation measurements from a respective plurality of GPS signals received by the mobile terminal;
   b. if the mobile terminal is in view of a communication satellite, then transmitting said plurality of observation measurements to said communication satellite for delivery to a service operations center for determination of a location of the mobile terminal; and
   c. if the mobile terminal is in view of a cellular mobile telephone network, then transmitting said plurality of observation measurements, along with location area information received from said cellular mobile telephone network, to a cellular tower in said cellular mobile telephone network for delivery to a service operations center for determination of a location of the mobile terminal.

2. The method of claim 1, wherein said observation measurements include code phase measurements.

3. The method of claim 1, wherein said observation measurements include carrier phase measurements.

4. The method of claim 1, wherein said observation measurements include doppler shift measurements.

5. The method of claim 1, wherein said observation measurements include bit phase measurements.

6. The method of claim 1, wherein said location area information is based on a location area identifier.

7. The method of claim 6, wherein said location area identifier is received from a broadcast control channel.

8. The method of claim 1, wherein said location area information is based on a base station identifier.

9. The method of claim 1, wherein said location area information identifies an area of interest in which the mobile terminal is located, said area of interest being smaller than a convergence zone, wherein a size of said convergence zone is an area around a mobile terminal location in which an initial position point must lie to guarantee that an iterative position calculation starting with said initial position point will converge to said mobile terminal position.

10. The method of claim 1, wherein one of said communication satellite and said cellular mobile telephone network is a default communication mechanism.

11. The method of claim 1, wherein one of said communication satellite and said cellular mobile telephone network is a backup communication mechanism.

12. A location determination method in a mobile terminal that is designed for communication with a communication satellite and with a cellular tower in a cellular mobile telephone network, wherein one of said satellite communication and said cellular mobile telephone network communication is designated as a preferred communication option and the other is designated as a backup communication option, comprising:
   a. taking a plurality of observation measurements from a respective plurality of GPS signals received by the mobile terminal;
   b. if the preferred communication option is available to the mobile terminal, then transmitting said plurality of observation measurements to a service operations center via the preferred communication option for determination of a location of the mobile terminal; and
   c. if the preferred communication option is not available to the mobile terminal, then transmitting said plurality of observation measurements to said service operations center via the backup communication option for determination of a location of the mobile terminal.

13. The method of claim 12, wherein location area information received from the cellular mobile telephone network is also communicated to said service operations center.

14. The method of claim 13, wherein said location area information is based on a location area identifier.

15. The method of claim 14, wherein said location area identifier is received from a broadcast control channel.

16. The method of claim 13, wherein said location area information is based on a base station identifier.

17. The method of claim 13, wherein said location area information identifies an area of interest in which the mobile terminal is located, said area of interest being smaller than a convergence zone, wherein a size of said convergence zone is an area around a mobile terminal location in which an initial position point must lie to guarantee that an iterative position calculation starting with said initial position point will converge to said mobile terminal position.

* * * * *